May 27, 1969

D. R. ST. CLAIR ET AL 3,446,178

CONVERTIBLE SCALE SPEEDOMETER CONSTRUCTION

Filed Nov. 29, 1966

INVENTORS
DONALD R. ST. CLAIR
WILLIAM H. REDFIELD by: Stephen A. Roen
ATTY.

May 27, 1969     D. R. ST. CLAIR ET AL     3,446,178
CONVERTIBLE SCALE SPEEDOMETER CONSTRUCTION
Filed Nov. 29, 1966
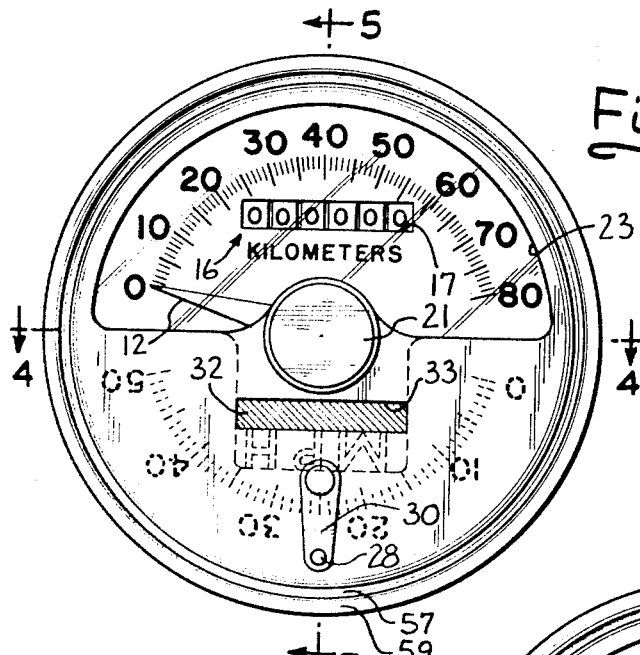
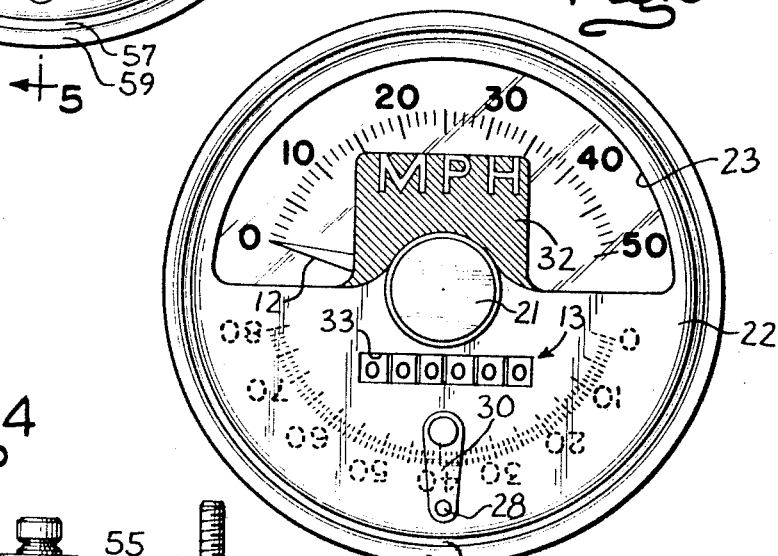
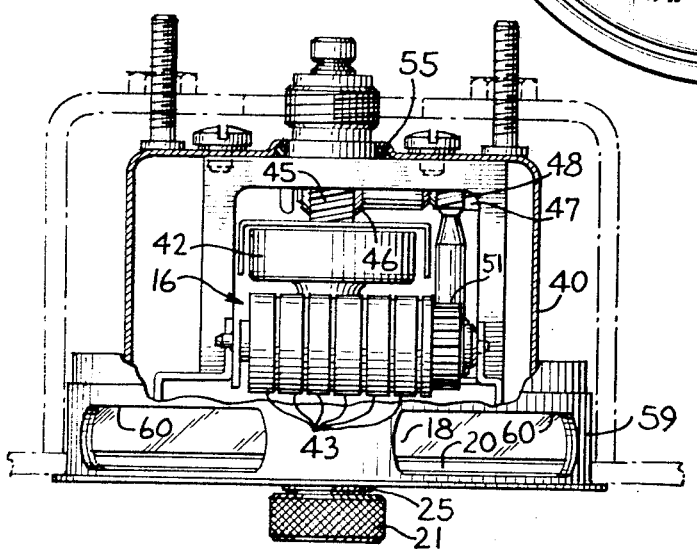
INVENTORS
DONALD R. ST. CLAIR
WILLIAM H. REDFIELD

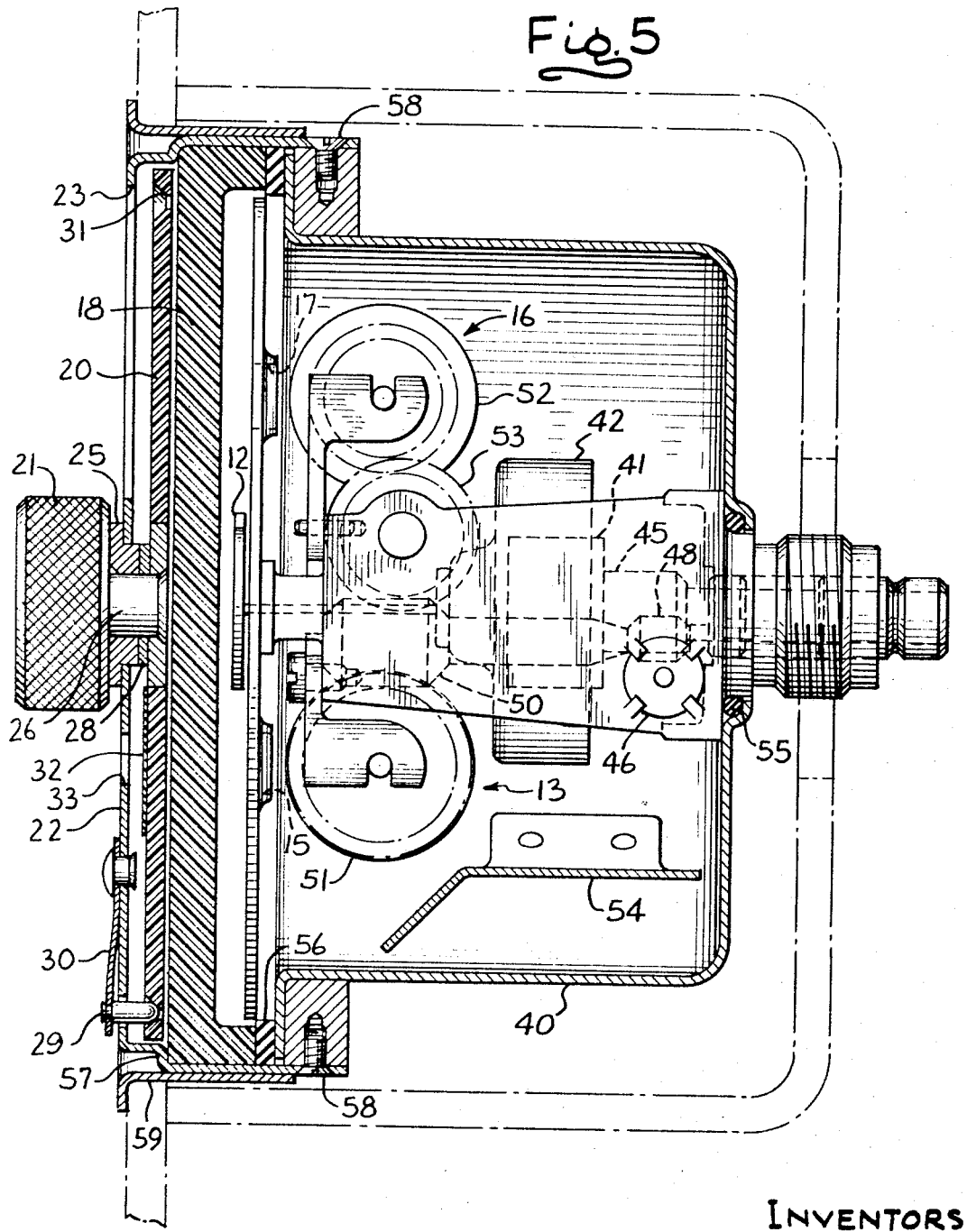

United States Patent Office 3,446,178
Patented May 27, 1969

3,446,178
CONVERTIBLE SCALE SPEEDOMETER CONSTRUCTION
Donald R. St. Clair, Mount Prospect, and William H. Redfield, Lake Forest, Ill., assignors to General Time Corp., New York, N.Y., a corporation of Delaware
Filed Nov. 29, 1966, Ser. No. 597,615
Int. Cl. G01p 1/06
U.S. Cl. 116—116          4 Claims

ABSTRACT OF THE DISCLOSURE

A speedometer dial face construction is described in which a transparent rotatable scale plate is used to alternately superimpose one of two scales on a single indicating dial face. One of two digital displays, each corresponding to one of the alternate dial scales, are embodied in the meter, and are selectively exposed to view in coordination with the associated dial scale in use.

---

This invention relates generally to the construction of meters, and more particularly to vehicle speedometers in which the data recorded or shown thereon is to be presented in more than one system of measurement units.

It is often useful to be able to read measurements in more than one system of units from a single meter. This may be accomplished, of course, by providing a number of scales on a single meter face or by use of several individually interchangeable scales to achieve the desired change in calibration. However, such systems are inadequate for many applications. In an automotive speedometer, for instance, it may be desriable to read data in both kilometers and miles. A single easily-read scale is also essential for quick and convenient reference by the operator. More than one scale, even if written in contrasting figures or colors, tends to be confusing and the desired information cannot be read at a quick glance under the pressure of traffic conditions. While a suitable change of scales might be accomplished by interchangeable dial faces, this technique requires that the meter be removed and taken apart, the existing scale removed, a new scale inserted, and the meter be reassembled and reinstalled. Not only is this technique tedious and time-consuming, but it exposes the inner workings of the mechanism to foreign matter and the possibility of damage. It also requires that the user have the required alternative meter scales available at all times.

Many speedometers simultaneously present their data in more than one form, such as speed and total distance traveled in an automobile speedometer. If the scale of one part of the meter is changed, the other scale should also change to avoid confusion to the user, but when the second display is digital, as in an automobile odometer, the solution cannot be achieved by the simple expedient of exchanging the dial face for one having a different scale, because the digital portion would be unchanged.

Accordingly, it is a principal object of the present invention to provide a speedometer construction wherein the scale calibration of the meter face may be changed exteriorly of the dial and meter mechanism without disassembly and exposure of the inner workings of the meter itself. It is a related object to provide a meter having a scale which is externally manually changeable so that the meter need not be moved from its mountings or opened to effect the desired change.

It is another object to provide a meter construction of the above description in which scale changes may be accomplished simultaneously for both digital and dial-type data displays appearing on the face of the same meter, such as a combined speedometer and odometer.

It is a further object to provide a meter construction of the above description in which the internal operating mechanism of the meter may be sealed against the entry of dirt and moisture without hindering the free interchangeability of meter scale calibrations.

Other objects and advantages of the invention will become apparent upon reading the following detailed description and upon reference to the drawings, where the invention is illustrated in connection with an automobile speedometer having a rotating dial to indicate instantaneous speed and a digital display to indicate the distance traveled. In the drawings:

FIG. 2 is an elevation of the speedometer dial face with one of two alternative scales of calibration units in viewing position;

FIG. 3 is an elevation similar to FIG. 2 with a second alternative scale of calibration units in viewing position;

FIG. 4 is a cross section taken in the plane 4—4 of FIG. 2; and

FIG. 5 is a cross section taken in the plane 5—5 of FIG. 2.

Figure 1:
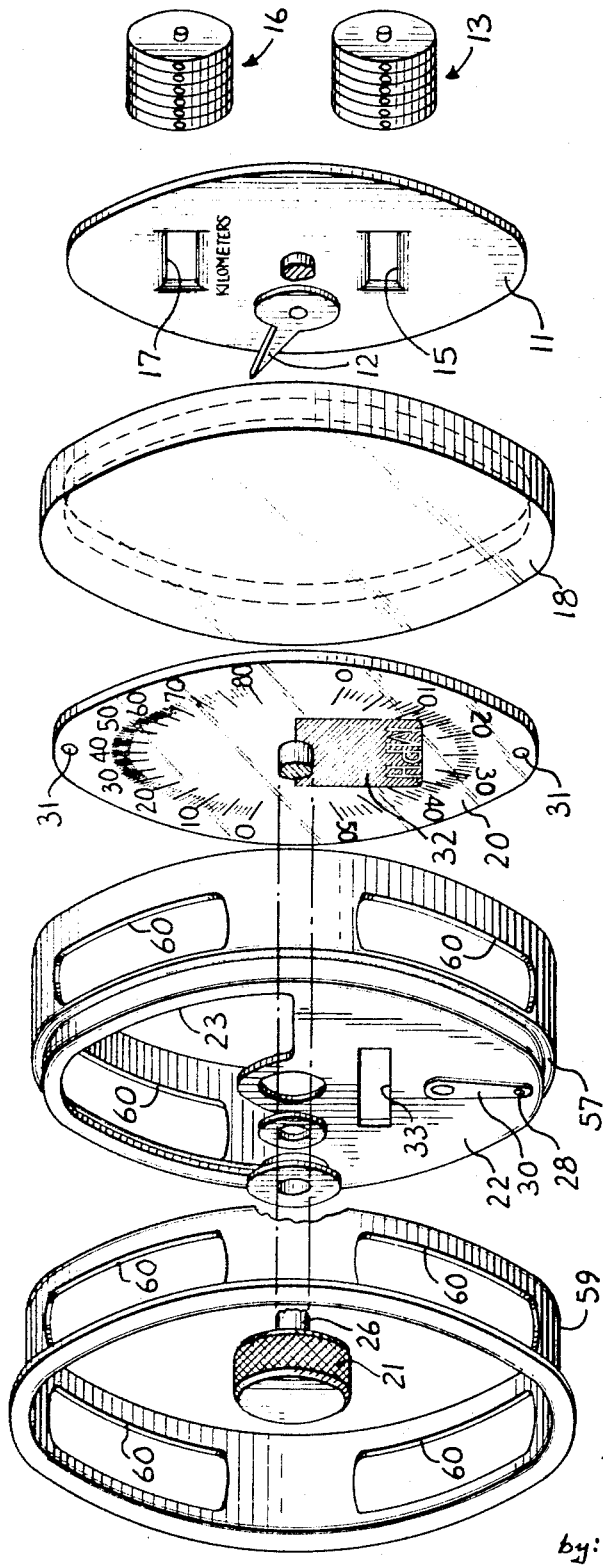
FIG. 1 is an exploded view of the dial assembly of a speedometer incorporating the present invention.

While the invention is described in connection with a preferred embodiment, it will be understood that I do not intend to limit the invention to that embodiment, but intend to cover all alternative and equivalent constructions as may be included within the spirit and scope of the invention.

Turning first to FIG. 1, there is shown in exploded form the dial assembly of a speedometer constructed according to the present invention. A dial face 11 serves as a background upon which the various data are presented. Since the described embodiment is a vehicle speedometer, a dial pointer 12 is provided for the indication of instantaneous speed. According to one aspect of the invention, distance traveled is indicated by two separate odometers calibrated in different units. An odometer 13 calibrated in miles is visible through a corresponding viewing port 15 in the dial face 11, and an odometer 16 calibrated in kilometers is visible through a second viewing port 17.

Covering the dial face 11 and serving to protect the pointer 12 and the odometers 15, 16 while leaving them fully visible is a transparent face plate 18 which is spaced from the dial and allows the pointer 12 to swing freely beneath its transparent face. It will be observed that no portion of the inner mechanism of the speedometer extends through the face plate 18, and this plate therefore serves as a seal to prevent the entry of dirt, moisture or other foreign matter into the internal workings of the speedometer.

The dial calibrations are carried by a separate circular scale plate 20 which is positioned external to and slightly spaced from the transparent face plate 18. As is best shown in FIG. 1, the generally transparent scale plate 20 incorporates two sets of calibrations, which in the illustrated embodiment are speed calibrations arranged in miles per hour and kilometers per hour. Because the total swing of the dial pointer 12 in the illustrated embodiment approximates 180° of the dial face, two complete scales may be inscribed on the scale plate 20. It will be appreciated that with dial swings of less than 180 degrees it will be possible to include additional scales. With a 120° pointer movement, three different scales may be included, and four scales with a pointer having 90° of movement.

In accordance with the invention, the scale plate 20 is selectively positionable in each of its operating positions by means of an operating knob 21. When one scale is in operating position, being superimposed over the range of pointer movement on the dial face 11, the other scale is obscured from view by a cover plate 22 having a dial opening 23 through which the dial pointer 12 and associated scale may be viewed. As is best shown in FIG. 2, when the kilometer scale is in position the miles scale is rotated out of sight beneath the cover plate 22. To allow rotation of the scale plate 20, the cover plate 22 carries a bushing 25 (FIG. 5) through which passes a shaft 26 by which the knob 21 and scale plate 20 are interconnected. A gland or packing 28 is provided on the shaft 26 adjacent the bushing 25 to retain lubricant and to provide a degree of tensioning to prevent vibration or rattling of the scale plate 20.

To secure the scale plate 20 in one or the other of its operating positions, a detent 29 is provided in the cover plate 22 which is urged against the scale plate 20 by a spring 30. The detent 29 cooperates with one of two depressions 31 to secure the scale plate 20 in one or the other of its operating positions. The operator simply turns the operating knob 21 until the desired scale calibrations appear in the window opening 23, and upon feeling or hearing the detent 29 drop into place, he releases the knob.

In accordance with another aspect of the invention, provision is made by which the proper one of the two digital odometer scales is brought into view simultaneously with the changing of the scale plate calibrations, and the undesired odometer face is obscured. This is accomplished by means of an opaque region 32 provided in the generally transparent scale plate 20. As shown in FIG. 1, the dial face 11 is provided with two viewports 15, 17 through which the respective odometers 13, 16 may be observed. The upper odometer, in this case the kilometer odometer 16 (FIG. 2), is viewed through the same window opening 23 provided for observation of the dial pointer 12. A second opening 33 is provided in the cover plate 22 for observation of the lower odometer, in this case the miles odometer 13 (FIG. 3). As a feature of the invention, the opaque region 32 serves to block the observer's view of the undesired miles odometer 13 by covering the viewing port 33 when the kilometer scale of the scale plate 20 is in operating position. When the miles scale of the scale plate is rotated into operating position, the opaque region 32 rotates upward to cover the viewing port 17 and the kilometer odometer 16 behind it.

In operation, it is necessary to provide a visual indication to the operator of which of the various interchangeable scales is in use at any given moment. This may be provided by the simple expedient of inscribing the visible portion of the scale plate 20 with the particular units of calibration used on that portion. In the illustrated embodiment, however, an alternative means is shown in which the scale inscription corresponding to the kilometer odometer 16, visible through the window opening 23, is inscribed beneath it on the dial face 11 rather than the scale plate 20. When the alternate miles scale is brought into operation, the opaque region 32 on the scale plate 20 obscures both the kilometer odometer 16 and the "KILOMETERS" inscription beneath it, while exposing the miles odometer 13 through the odometer view opening 33 as described previously. To provide visual indication that the miles scale is operative, the inscription "MPH" is applied to the visible portion of the opaque region 32, but in an area where it cannot be seen through the odometer view opening 33 when the miles scale is not in use. In this way, when the speedometer is being used in the kilometers mode of operation, the opaque region 32 blocks the miles odometer 13 and the "MPH" inscription is out of sight. When the speedometer is shifted to the miles mode by rotation of the operating knob 21, the miles odometer 13 is exposed through the odometer view opening 33 and the kilometer odometer 16 is obscured by the opaque region 32 which instead presents in its place the "MPH" inscription. If one scale—for instance the miles scale—is seldom used and an extra visual warning of its presence is desired, the opaque region 32 may be made a bright contrasting color such as red to immediately call the operator's attention to the fact that a different scale is in use from the one to which he may be accustomed.

The inner mechanism of the speedometer itself is of well-known construction, and does not comprise a part of the present invention. It will be dealt with only briefly. An outer case 40 (FIG. 5) serves as a frame to which the internal elements are secured, and may itself be secured to an instrument panel or dashboard by any of several means, such as by clamps or brackets. An input shaft (not shown) from one of the drive elements of the vehicle such as the transmission serves to rotate a magnetic disk 41 within a metal cup 42 which is attached to the dial pointer 12 and restrained by a return spring (not shown). The rotation of the magnetic disk 41 induces eddy currents within the cup 42 creating a torque proportional to the rate of disk rotation which causes the dial pointer 12 to move across the dial face 11. When the eddy current torque generated by the rotation of the input shaft is in equilibrium with the force exerted by the return spring, the pointer 12 will reach equilibrium at a position corresponding to the rate of rotation of the input shaft. When the relationship of shaft rotation to vehicle speed is known, the dial increments may be applied accordingly to the scale plate 20. With the present invention, however, no change of gear ratios or other mechanical adjustments are needed to accomplish the change from one speedometer unit calibration to another.

Similary, the construction of the present invention requires no modification of the odometer gear train. As in conventional odometer construction, a gear train is provided by which the rotation of the input shaft is reduced and applied to a bank of indicator wheels 43 which comprise the odometers 13, 16. The operation of odometers of this type is well known in the art and need not be gone into detail here, except to say that each individual digit wheel 43 in the odometer assembly, upon rotation of one complete revolution, causes its next adjoining wheel to move forward one digit increment. With six digit wheels, as in the illustrated embodiment, and with ten digits inscribed around the periphery of each wheel, the total number of kilometers (or miles) that may be accumulated is 99,999.9 which is adequate for most automotive uses. Speed of the input shaft is reduced by a first worm gear 45 in mesh with a worm wheel 46 which is drivingly connected to a second worm gear 47 which drives a second worm wheel 48. The latter is drivingly connected with a third worm gear 50 which drives the lower odometer 16 by means of a third worm gear 51. The latter also drives a drive gear 52 for the upper odometer 16 through an idler gear 53.

In the illustrated embodiment, a flange 54 is provided within the case 40 to secure a container of dessicant such as silica gel (not shown) to absorb any excess of moisture within the case and prevent corrosion of the internal parts and fogging of the face plate 18.

It is a feature of the invention that the scale-changing feature is external to the meter mechanism itself, allowing the mechanism to be sealed within its case 40 against the entry of dirt, moisture or other foreign matter. For this purpose an O-ring 55 is provided at the rear of the case 40 where the drive shaft enters, and a gasket 56 is sandwiched between the transparent face plate 18 and the cover 40. The face plate 18 is in turn secured to the case 40 by the masking cover plate 22, which has a stepped ridge 57 about its periphery to hold the transparent plate 18 in place. The entire assembly is secured by means of screws 58. For mounting purposes, an additional bezel ring 59 is provided which is attached in unit with the masking cover plate 22 and provides a flange by which the meter may be seated against an instrument panel or vehicle dashboard. Openings 60 are provided in the cover 22 and bezel 59 so that the meter may be illuminated by light passing through the face plate 18 from a light source behind the dashboard or instrument panel.

We claim as our invention:

1. In a speedometer having a dial face and pointer indicating the magnitude of one measured quantity, a first digital display indicating the magnitude of a second measured quantity, and a second digital display indicating the magnitude of said second measured quantity in measurement units different from said first digital display, an interchangeable scale construction comprising, in combination, a cover plate having view openings for the viewing of said dial face and digital displays, a shiftable transparent scale plate bearing first and second alternative scale calibrations corresponding with said dial face, shifting means for shifting said scale plate to selectively position one of said scale calibrations to overlie said dial face, releasable securing means carried by said cover plate for superimposing said scale plate in a desired position relative to said dial face, and an opaque mask carried by said scale plate and disposed with respect to said view openings such that one of said digital displays is obscured when a scale calibration corresponding to the other of said digital displays is in viewable coincidence with said dial face.

2. Apparatus as defined in claim 1 in which said shifting means includes an external rotatable knob and said releasable securing means includes means for releasably detenting said scale plate in predetermined positions in which one of said scale calibrations is superimposed in viewable coincidence with said dial face.

3. Apparatus as defined in claim 1 in which said dial face and pointer and said digital displays are covered by a transparent face plate underlying said shiftable scale plate.

4. In a meter movement having a visible dial face, a pointer superimposed on said dial face for presentation of information, and a transparent face plate protectively enclosing said dial face and pointer, the combination comprising a rotatable transparent scale plate having first and second scale calibrations, said second scale calibrations being located apart from said first scale calibrations, said scale plate being carried exteriorly of said transparent face plate and meter movement, shifting means for rotating said scale plate to selectively superimpose one of said scale calibrations on said dial face, said shifting means including an external rotatable knob and releasable securing means including means for detenting said scale plate in predetermined superimposed positions in which one of said scale calibrations is superimposed on said dial face, and cover means for masking the other of said scale calibrations not superimposed on said dial face.

References Cited

UNITED STATES PATENTS

| | | | |
|---|---|---|---|
| 1,307,157 | 6/1919 | Smithey | 116—57 X |
| 2,175,129 | 10/1939 | Rolfson | 116—57 |
| 2,558,276 | 6/1951 | Simpson et al. | 324—115 |
| 2,657,357 | 10/1953 | Rosso | 324—115 X |
| 2,798,454 | 7/1957 | Gleeson | 116—57 X |
| 2,810,362 | 10/1957 | Lindheim | 116—116 |
| 2,903,992 | 9/1959 | Najjar | 116—57 |
| 3,263,503 | 8/1966 | White | 73—431 |

LOUIS R. PRINCE, *Primary Examiner.*

DANIEL M. YASICH, *Assistant Examiner.*

U.S. Cl. X.R.

73—431, 498; 324—115